3 Sheets--Sheet 2.

U. F. BIGGS.

Improvement in Theodolites.

No. 129,311.            Patented July 16, 1872.

Witnesses:
E. Lyou Corbin
J. West Wagner

Inventor:
Upton F. Biggs
by Johnson, Klaucke & Co
his Attorneys

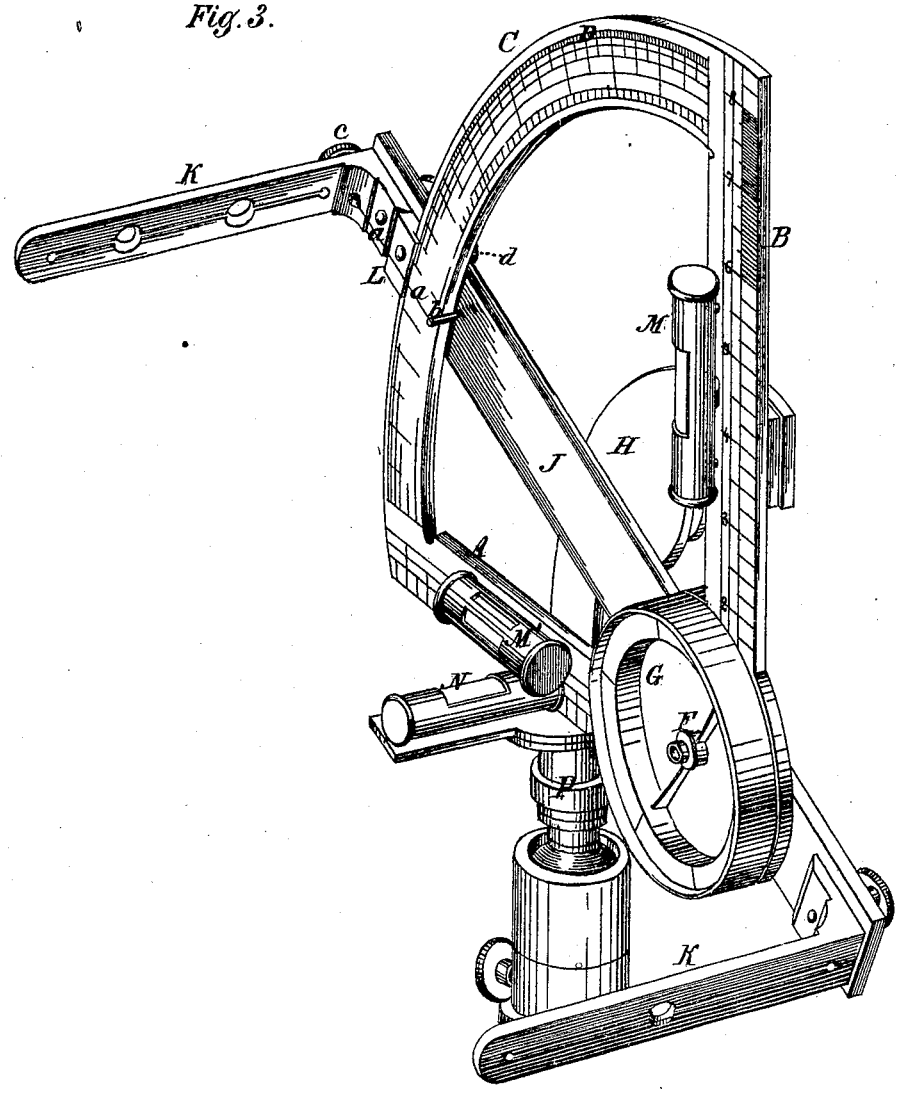

129,311

UNITED STATES PATENT OFFICE.

UPTON F. BIGGS, OF OAKLAND, ASSIGNOR OF ONE-THIRD OF HIS RIGHT TO WILLIAM F. DEAKINS AND LOUISA M. DEAKINS, OF WINSTON, AND HORACE RESLEY, OF CUMBERLAND, MARYLAND.

IMPROVEMENT IN THEODOLITES.

Specification forming part of Letters Patent No. 129,311, dated July 16, 1872.

*To all whom it may concern:*

Be it known that I, UPTON F. BIGGS, of Oakland, in the county of Alleghany and State of Maryland, have invented certain new and useful Improvements in Theodolites, of which the following is a specification:

My invention relates to that class of surveyors' instruments in which the calculations as to length and breadth, depression and elevation, are determined by scales; and my said invention consists in combining, with a quadrant theodolite having its scale of feet and inches projected both from the center of the compass and the base-scales thereof, a pivot-socket on one of its bases in addition to the usual central pivot-socket. My invention also consists in the construction and arrangement of the several parts of the theodolite to produce the results hereinafter described.

Figure 1:
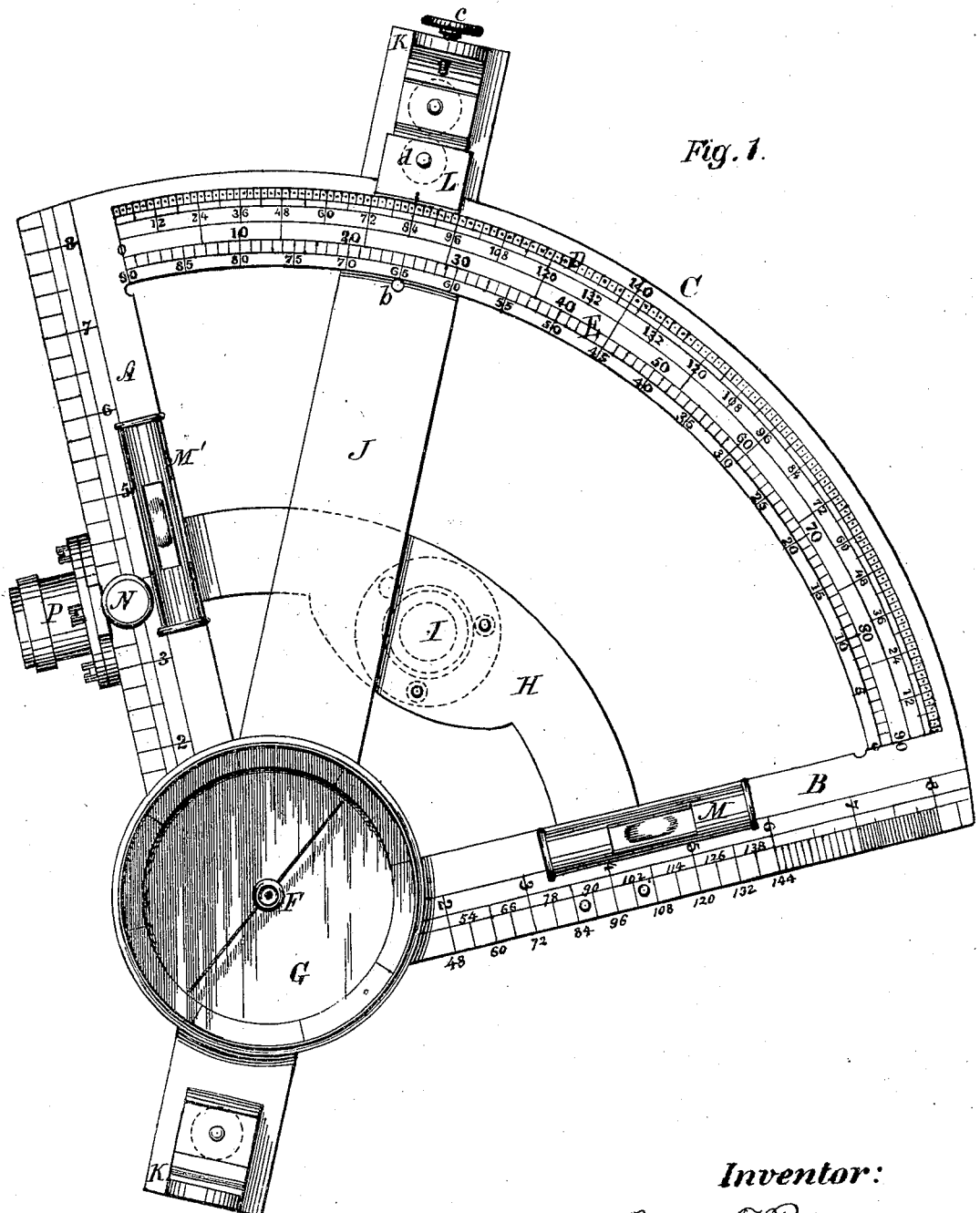
Figure 2:
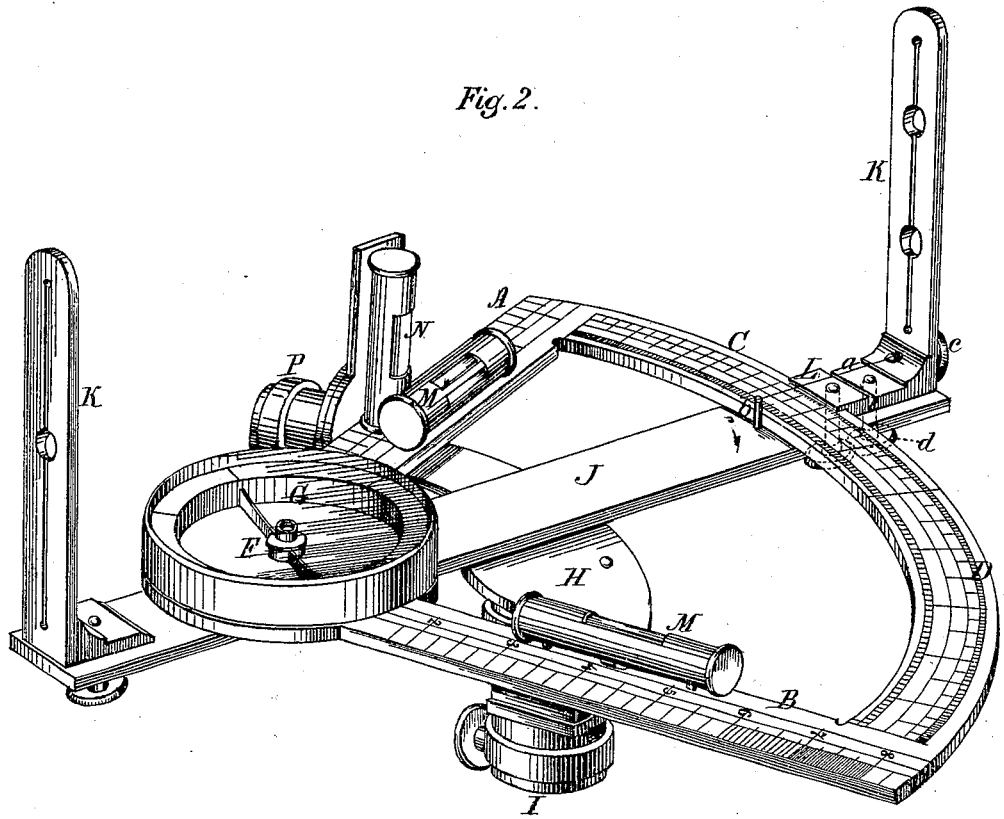

In the accompanying drawing, Figure 1, Sheet 1, represents a plan or top view of a theodolite embracing my invention. Fig. 2, Sheet 2, represents a view in perspective of the same in a horizontal position for obtaining range and the measurement of distance. Fig. 3, Sheet 3, represents a similar view of the instrument in a vertical position for the measurement of elevations and depressions.

My improved theodolite consists of a quadrant, the bases A B and the arc C of which are provided with scales, those of the bases being in divisions—the twenty-fourth part of an inch—and the outer one, D, of the arc C, of corresponding spaces in two equal divisions of 140 each, making in all 280, each the twenty-fourth part of an inch; while the inner one, E, is laid off in degrees of the circle in the usual manner. At the point where the inner edges of the two bases A and B meet is formed the center F of a compass, G, and the distance from this center F, which forms a circle of which the arc C is a part, to the outer scale D is exactly eight inches and a quarter, being the twenty-fourth part of a rod, so that the divisions of the outer scale are in proportion of one inch to the rod in a line from the compass center F to the circumference of the said scale. An intermediate arc, H, serves for the attachment of the central pivot I of the instrument, and the support of the transit-bar J, which, being pivoted beneath the center F of the compass, extends a suitable distance beyond the apex and the arc of the quadrant to receive and support the usual sight-standards K, and supported at its outer end upon the arc C by a guide-plate, L. The sight-line of the transit-bar J is indicated across the arc by a hair-line, a, held by a pin, b, and screw c of said bar. Each base of the quadrant is provided with a level, M and M', for use with the quadrant in a horizontal position, as shown in Figs. 1 and 2. A third level, N, is arranged at right angles to the one, M', and is supported, in the example shown, upon the flange of the supplemental tripod-socket, the level M' having its opposite sides open to act in conjunction with the one, N, and thereby obtain the advantage of two levels, whether the instrument be used in a vertical or horizontal position, as shown in Fig. 3. At a suitable point on the outer edge of the base A is attached a tripod-socket, P, to allow the quadrant to be used in a vertical position; while the socket I, secured to the under side of the brace H, serves for the tripod attachment when the quadrant is used in a horizontal position. The scale D is projected on the arc C in the following manner, viz.: Five and eighty-three hundredths inches on each of the bases A and B from the center are laid off in twenty-fourth parts of an inch, and lines projected from each of these divisions at right angles to the bases. Where these lines cross the line of the outer scale D of the arc C these twenty-fourth parts of an inch are laid off on the arc radially and in this way, beginning at each end of the arc, one hundred and forty twenty-fourth parts of the inch are laid off on the arc toward the center, or two hundred and eighty such divisions on the entire arc. It will be understood that as these divisions on the arc C increase in size in regular graduation from each end toward the center they are true and correctly measured, so as always to preserve the relative proportion with respect to the length of the bases A B of one inch to the rod with every degree of inclination.

The operation of my instrument is as follows: If it is desired to measure the height of an object at a distance, the quadrant is placed vertically on the tripod, the socket P on base A serving for that purpose, and it is, by means of the two levels, M' and N, set true. The transit-bar J then being moved until the line of sight touches the object or point, the height of which is to be ascertained, it is held on that point by means of the guide L and a clamp-screw, d, at its outer end. We will suppose the hair or thread a is then directly over the line on the outer scale of arc C, opposite the number 84. (See Fig. 1.) This indicates that the line from the instrument to the top of the object rises at the rate of eighty-four inches or seven feet to the rod. The instrument is now raised in any suitable manner in as near a vertical line as possible until a difference of declension of one division on scale D is obtained. We will suppose that it requires an elevation of the instrument of fifteen feet to obtain this difference of one inch to the rod; consequently it would require twelve by fifteen, or one hundred and eighty feet elevation of the instrument, to make a declension of one foot. The elevation of the line being, however, seven feet to the rod, it will be easily seen that the height of the object must be seven by one hundred and eighty, or twelve hundred and sixty feet. Or the calculation would be really made in the following manner: Elevation, eighty-four inches; declension, fifteen feet to the inch—eighty-four by fifteen = twelve hundred and sixty— so avoiding first the division of eighty-four by twelve, and afterward the multiplication of fifteen by twelve.

To measure a distance the instrument would be placed horizontally, the socket I being placed on the tripod, and the instrument set level by the levels M M'. The compass being adjusted, the line of sight is brought to bear on the object. If the hair or thread a then indicates, for instance, 48, and in a direction, say, east twelve inches south, this indicates that there is a departure of twelve inches from the base line to the rod. By now moving the instrument south sufficiently to give one inch departure from the former line, and that in order to obtain this one inch departure it is required to move the instrument one foot, it will be determined that the extent of the departure is one foot for every rod. The departure being twelve by twelve inches, or twelve feet, the distance from the object will, therefore, be twelve rods.

I am well aware that theodolites have been constructed with a view of rendering elaborate calculations unnecessary; and this object has been sought to be attained by complicated and expensive construction of the instrument; but I am not aware of any case in which the instrument has been constructed in relative proportions of inches to rods, or where any such relative proportioned scale has been used. Nor am I aware that a socket has been applied to one of the bases of the instrument to render the same applicable for use horizontally or vertically.

I have shown a scale of degrees upon the arc of the quadrant. I do not, however, use it in making first measurements, but only to reduce measurements, which may have been already taken by other instruments in degrees, to rods, feet, and inches by my new quadrant-scale, projected from the bases, and maintaining a relative distance to the measuring-center to produce certain results.

My improved theodolite is extremely simple in its construction, and is easily handled, and may be employed in all the various uses for which theodolites or quadrants are used. By it the rate of speed of vessels at sea, and their distance from another vessel or given point, may be easily and rapidly determined; and all its parts are such as will not easily get out of order. It combines all the different surveyors' and engineers' instruments—the compass, the transit, the quadrant, and the level. It finds its own meridians, and gives every slope. It gives length and breadth, depression and elevation. By it the distance to any object can be found as quick as thought. The whole instrument costs no more than the old compass, and can be easily carried. It is to a man as a calculator or an interest-table, and, with a little explanation, can be easily learned.

Having described my invention, I claim—

1. The socket P, arranged on the base A to serve for using the theodolite in a vertical position, essentially as described.

2. The combination, in a theodolite, of the bases A B, arc C provided with scales D E, transit-bar J with its sight-standards K, arc H, levels M M' and N, sockets I P, and compass G, all arranged for use essentially as described.

U. F. BIGGS.

Witnesses:
JOHN G. C. RISLEY,
D. E. OFFUTT.